(12) United States Patent
Tu et al.

(10) Patent No.: US 8,526,772 B2
(45) Date of Patent: Sep. 3, 2013

(54) COMPRESSION OF POLARIZED SUPERCONTINUUM PULSES GENERATED IN BIREFRINGENT ALL NORMAL-DISPERSION PHOTONIC CRYSTAL FIBER

(75) Inventors: Haohua Tu, Savoy, IL (US); Stephen A. Boppart, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 284 days.

(21) Appl. No.: 13/184,025

(22) Filed: Jul. 15, 2011

(65) Prior Publication Data

US 2012/0049092 A1 Mar. 1, 2012

Related U.S. Application Data

(60) Provisional application No. 61/377,155, filed on Aug. 26, 2010.

(51) Int. Cl.
*G02B 6/00* (2006.01)
*H01S 3/10* (2006.01)
*G02B 6/032* (2006.01)

(52) U.S. Cl.
USPC .............................. 385/122; 385/125; 372/21

(58) Field of Classification Search
USPC ....................................................... 385/122
See application file for complete search history.

(56) References Cited

U.S. PATENT DOCUMENTS 7,609,731 B2  10/2009  Dantus et al. ................... 372/30
7,957,619 B2 *  6/2011  Nicholson et al. ............ 385/122
2011/0058769 A1 *  3/2011  Nicholson et al. ............... 385/28
2012/0049092 A1 *  3/2012  Tu et al. ..................... 250/504 R
2012/0224597 A1 *  9/2012  Jespersen et al. .......... 372/29.02

OTHER PUBLICATIONS

Druon et al., "Pulse-compression down to 20 fs using a photonic crystal fiber seeded by a diode-pumped Yb:SYS laser at 1070 nm," *Opt. Exp.*, vol. 12, No. 15, pp. 3383-3396 (2004).
Heidt, "Pulse preserving flat-top supercontinuum generation in all-normal dispersion photonic crystal fibers," *J Opt. Soc. Am. B*, vol. 27, No. 3, pp. 550-559 (2010).
Kristensen et al., "Low-loss polarization-maintaining fusion splicing of single-mode fibers and hollow-core photonic crystal fibers, relevant for monolithic fiber laser pulse compression," *Opt. Exp.*, vol. 16, No. 13, pp. 9986-9995 (2008).
McConnell et al., "Ultra-short pulse compression using photonic crystal fibre," *Appl. Phys. B*, vol. 78, pp. 557-563 (2004).
Nicolson et al., "A high coherence supercontinuum source at 1550 mm," *OFC*, 3 pages (2004).
Nishizawa et al., "Octave spanning high-quality supercontinuum generation in all-fiber system," *J. Opt. Soc. Am. B*, vol. 24, No. 8, pp. 1786-1792 (2007).

(Continued)

*Primary Examiner* — Rhonda Peace
(74) *Attorney, Agent, or Firm* — Sunstein Kann Murphy & Timbers LLP

(57) ABSTRACT

Methods and apparatus for generating ultrashort optical pulses. Polarized pulses of a near-infrared source are launched substantially along a principle axis of a birefringent photonic crystal fiber characterized by normal dispersion at all wavelengths of transmission of the photonic crystal fiber. Supercontinuum pulses are generated from the photonic crystal fiber and compressed to form compressed pulses. Highly polarized supercontinuum pulses provide for transform-limited compressed pulse durations.

14 Claims, 2 Drawing Sheets

(56) References Cited

OTHER PUBLICATIONS

Südmeyer et al., "Nonlinear femtosecond pulse compression at high average power levels by use of a large-mode-area holey fiber," *Opt. Soc. Am.*, vol. 28, No. 20, pp. 1951-1953 (2003).

Tomlinson et al., "Compression of optical pulses chirped by self-phase modulation in fibers," *J. Opt. Soc. Am. B*, vol. 1, No. 2, pp. 139-149 (1984).

Tu et al., "Emergence of self-organized long-period fiber gratings in supercontinuum-generating optical fibers," *Opt. Soc. Am.*, vol. 34, No. 5, pp. 668-670 (2009).

Tu et al., "Scaler generalized nonlinear Schrödinger equation-quantified continuum generation in an all-normal dispersion photonic crystal fiber for broadband coherent optical sources," *Opt. Exp.*, vol. 18, No. 26, pp. 27872-27884 (2010).

Udem et al., "Optical frequency metrology," *Nature*, vol. 416, pp. 233-237 (2002).

Von Vacano et al., "Shaper-assisted collinear SPIDER: fast and simple broadband pulse compression in nonlinear microscopy," *J. Opt. Soc. Am. B*, vol. 24, No. 5, pp. 1091-1100 (2007).

Zhao et al., "Characteristics of supercontinuum generation in birefringent optical fibers," *Proc. IEEE/LEOS*, pp. 217-220 (2003).

\* cited by examiner

COMPRESSION OF POLARIZED SUPERCONTINUUM PULSES GENERATED IN BIREFRINGENT ALL NORMAL-DISPERSION PHOTONIC CRYSTAL FIBER

The present application claims priority from U.S. Provisional Application Ser. No. 61/377,155, filed Aug. 26, 2010, which is incorporated herein by reference.

This invention was made with government support under Grants NCI R33 CA115536, NIBIB R01 EB009073, and NCI RC1 CA147096, awarded by the National Science Foundation. The Government has certain rights in the invention.

TECHNICAL FIELD

The present invention relates to methods and apparatus for optical pulse compression, and, more particularly, to pulse-width-tunable and wavelength-tunable transform-limited compression of an infrared fiber supercontinuum pulse.

BACKGROUND ART

A source of compact ultrafast pulses, where each pulse is transform-limited with a duration approaching a single optical cycle, is in high demand for such applications as ultrafast spectroscopy, fluorescence spectroscopy, photochemistry and photophysics, coherent controlled micro-spectroscopy, multiphoton microscopy, fluorescence lifetime imaging, and non-linear biomedical imaging. White-light generation by the combination of a photonic crystal fiber (PCF) and an oscillator-type ultrafast laser is a promising technology for this source.

To generate a fiber supercontinuum pulse that is compressible to less than 20 fs, the prior art has uniformly considered the benefits, if not the necessity, of selecting a short (<1 cm) fiber length, a short (<50 fs) incident laser pulse, an adequately low pulse energy (<2 nJ) (i.e., fiber transmitting power), a particular spectral range of the supercontinuum, or combinations of the four. None of these restrictions are practically desirable due to fiber-handling difficulty, laser complexity, and low power output. It is therefore useful and surprising that a <10 fs transform-limited supercontinuum pulse without the spectral selection can be generated from a relatively long (9.1 cm) nonlinear fiber pumped by a laser with a relatively long (220 fs) pulse at a relatively high (>300 mW) fiber transmitting power, as practiced in accordance with the present invention, which is described below.

All of the foregoing restrictions are intended to improve the coherence of the supercontinuum conventionally generated by a PCF having a zero-dispersion-wavelength (ZDW) located inside the spectral range of the supercontinuum. The reason such a zero-dispersion PCF is chosen for supercontinuum generation is that, within a PCF with a spectral locus of zero dispersion, soliton dynamics are available for generating the broadest supercontinuum, and, in principle, could lead to the shortest pulse. However, in order to develop a practical and useful ~10 fs fiber supercontinuum source, it is advantageous to perform the entire spectral broadening in a normal dispersion region of the fiber, and therefore remove all these restrictions. Südmeyer et al., in *Nonlinear femtosecond pulse compression at high average power levels by use of a large-mode-area holey fiber*, 28 Opt. Lett. 1951-53 (2003) used this technique to generate 33 fs pulses centered at 1030 nm. McConnell and Riis, in *Ultra-short pulse compression using photonic crystal fibre*, 78 Appl. Phys. B 557-63 (2004), used this technique to generate 25 fs pulses centered at 830 nm. Both of the foregoing papers are incorporated herein by reference.

To generate shorter pulse along this approach, Nishizawa et al. proposed the use of dispersion-flattened dispersion-decreased all-normal dispersion fibers (DFDD-ANDiF) (in which the ZDWs are merged in frequency to the point that the spectrum of the fiber lacks anomalous dispersion altogether within the effective wavelength range) for supercontinuum generation in *Octave spanning high-quality supercontinuum generation in all-fiber system*, 24 J. Opt. Soc. Am. B 1786-92 (2007), which is incorporated herein by reference. Heidt, in *Pulse preserving flat-top supercontinuum generation in all-normal dispersion photonic crystal fibers*, 27 J. Opt. Soc. Am. B 550-59 (2010), incorporated herein by reference, suggested that PCF-based DFDD-ANDiF should give rise to an output with a high degree of coherence. These two studies noted that if a supercontinuum pulse were to be generated from this type of fibers, then it should be recompressible to the sub-10 fs regime. These studies, however, paid no regard to the polarization properties of the fiber nor of the optical fields it supports. The spectrally flat supercontinuum of both studies, however, is not compressible in practice, because neglecting polarization properties results in a supercontinuum lacking spectral coherence and thus not subject to effective compression.

According to Tomlinson et al., *Compression of optical pulses chirped by self-phase modulation in fibers*, 1 J. Opt. Soc. Am., pp. 139-49 (1984), a supercontinuum dominated by SPM can only undergo high-quality pulse compression through a conventional grating (or prism) compressor if an optimal fiber length is selected to linearize the chirp of the supercontinuum. This condition is not only practically difficult, but, in the case of microscopy, where a large higher-order dispersion is associated with the microscope objective, it is impossible. It is not surprising, therefore, that attempts to compress the SPM-dominated supercontinuum by means of a grating or prism compressor have been unable to compress the pulse close to the transform-limit. Additionally, the main temporal peak of the pulse, in prior practice, has often been associated with undesirably large sidelobes.

SUMMARY OF EMBODIMENTS OF THE INVENTION

In accordance with embodiments of the invention, apparatus and methods are provided for generating clean, transform-limited pulses of tunable duration and wavelength. Methods in accordance with preferred embodiments, methods have steps of:

a. coupling polarized pulses of a near-infrared source along a principal axis of a birefringent photonic crystal fiber characterized by normal dispersion at all wavelengths of transmission of the photonic crystal fiber;

b. generating supercontinuum pulses from the photonic crystal fiber; and c. compressing the supercontinuum pulses to form compressed pulses, each compressed pulse characterized by a full-width-half-maximum duration.

In accordance with alternate embodiments of the invention, each of the incident pump pulses may be characterized by a pulsewidth shorter than 2 ps (full-width at half maximum, FWHM) and by an energy per pulse exceeding 2 nJ. The supercontinuum pulses may be characterized by a polarization extinction ratio greater than 10. The method may have a further step of frequency-doubling the compressed pulses, such as in a non-linear crystal. More particularly, the fullwidth-half-maximum pulsewidth of the compressed pulses may be less than 50 femtoseconds and is preferably less than 12 fs. The full-width-half-maximum pulsewidth of the compressed pulses may vary as a continuous function of the energy per pulse of the near-infrared source. Spectral filtering may be performed to tune the wavelength of the compressed pulses.

In other embodiments, the near-infrared source may be a diode-pumped solid-state ytterbium laser. The photonic crystal fiber may be characterized by a length longer than 5 CM.

In accordance with yet another embodiment of the invention, an apparatus is provided for generating ultrashort optical pulses. The apparatus has a near-infrared source of polarized pulses which may be characterized by a pulsewidth shorter than 2 ps and an energy per pulse exceeding 2 nJ. The apparatus, moreover, has a photonic crystal fiber characterized by normal dispersion at all wavelengths of transmission of the photonic crystal fiber. Finally, the apparatus has a pulse compressor for compressing each supercontinuum pulse exiting the photonic crystal fiber. More particularly, the source of near-infrared pulses may be an ytterbium laser.

BRIEF DESCRIPTION OF THE DRAWINGS

The foregoing features of the invention will be more readily understood by reference to the following detailed description, taken with reference to the accompanying drawings, in which.

DETAILED DESCRIPTION OF EMBODIMENTS OF THE INVENTION

Definitions: As used herein, birefringence is defined as the difference between effective refractive indices of an optical fiber for two polarized waves launched along orthogonal principle axes of the fiber, as measured at a typical wavelength. A fiber may be referred to as "birefringent" if it exhibits a birefringence of at least $1 \times 10^{-5}$. A fiber with birefringence less than $2 \times 10^{-5}$ may be referred to as "weakly birefringent."

For purposes of the present description and any appended claims, a polarization extinction ratio denoting the ratio of optical power between two orthogonal linear polarization directions may be referred to as "high" if it is larger than 10 (or, equivalently, 10 dB). A length of PCF used for purposes of supercontinuum generation may be referred to as "long" if it is longer than 5 cm.

For purposes of the present description and any appended claims, "substantially," as referring to an angle, shall denote alignment to within 10° of rotation.

In accordance with preferred embodiments of the present invention, an all-normal dispersion PCF, having no ZDW(s) located inside the spectral range of a generated supercontinuum, is advantageously applied in order to provide a practical and useful fiber supercontinuum source and, thereby, to remove the restrictions of short fiber length, short incident laser pulse, a low pulse energy, and any particular spectral range of the supercontinuum. An apparatus and various methods are provided for generating clean, transform-limited pulses of tunable duration.

In the present invention, for the first time, it is recognized that unless the birefringence of the PCF is at least a minimum value dependent upon the temporal width of the input pulse and the group velocity dispersion (GVD) of the fiber, effective pulse compression to a transform-limited regime may not be obtained. This birefringence allows the supercontinuum to be generated with high polarized extinction ratio (>10) in a long (>5 cm) fiber, as practiced in accordance with the present invention, which is described below.

Figure 1:
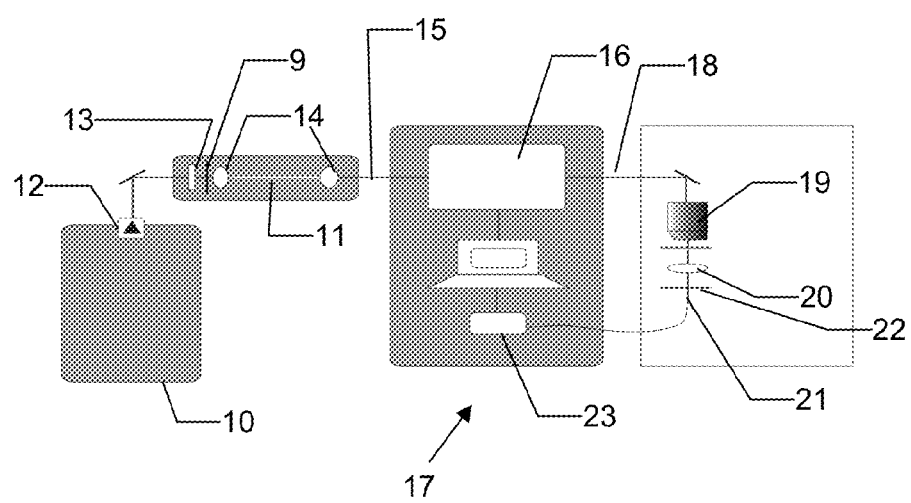
FIG. 1 is a schematic of fiber supercontinuum source utilizing a MIIPS-assisted pulse shaper in accordance with one embodiment of the present invention.
Figure 2:
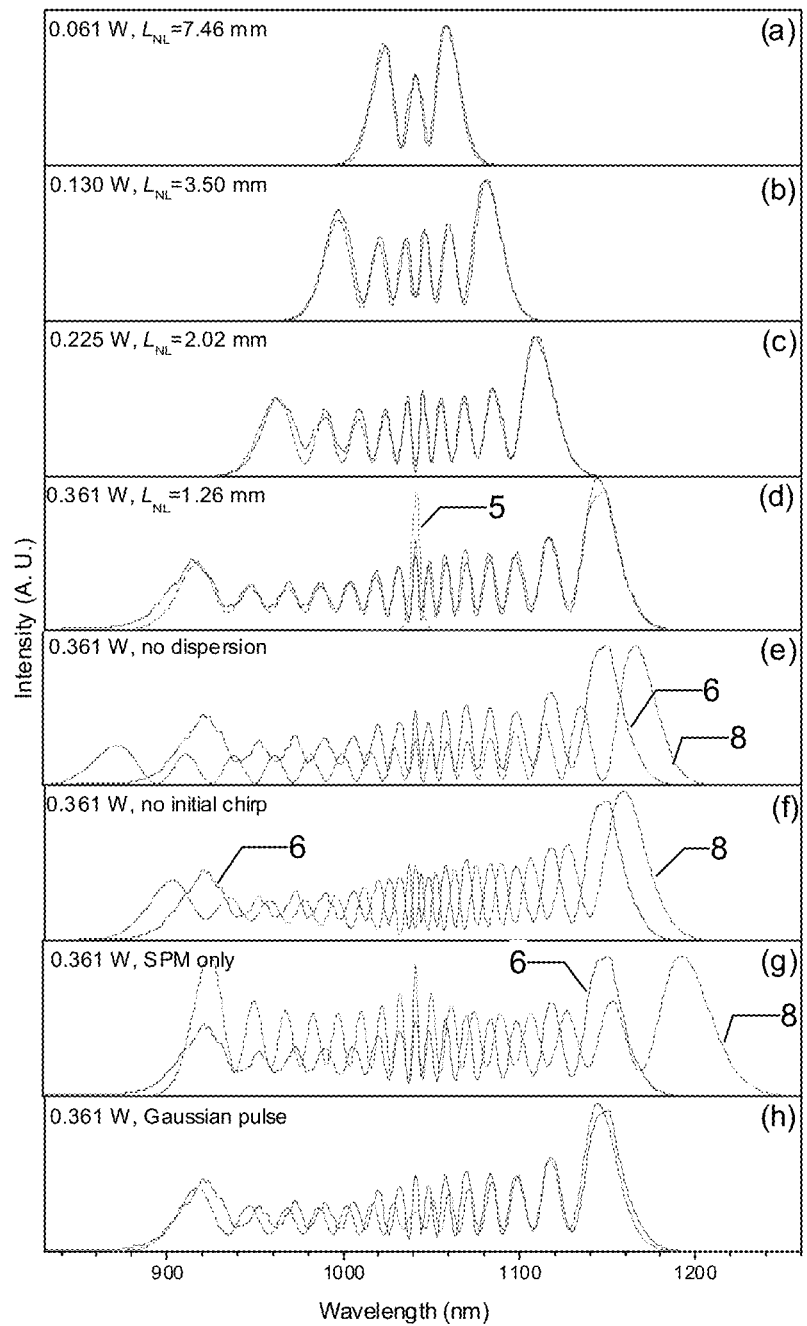
FIGS. 2(a)-2(h) compare simulated with observed fiber continuum spectra of the 9.1-cm PCF at fiber output powers of 0.061 W, 0.130 W, 0.225 W, and 0.361 W, in accordance with embodiments of the present invention. The spectrum of the incident laser pulses is depicted as well.

In one embodiment of the invention, described with reference to FIG. 1, a near-infrared laser 10, such as a diode-pumped solid-state Yb:KYW laser, with emission centered close to 1040 nm, generates polarized pulses having pulsewidths on the order of 220-fs (FWHM) at a rate typically about 80-MHz. Pulsewidths are preferably in the range shorter than 2 ps. These polarized pulses are launched, via a coupler, such as an aspheric lens 14, into the core of an all-normal dispersion PCF along one of the two principal axes of the PCF 11. It is to be understood that other sources of polarized infrared radiation may be employed within the scope of the present invention. Alternatively, the free-space-to-fiber coupling may be replaced by fusion splicing the supercontinuum-generating fiber to the fiber output of a (fiber-based) polarized infrared radiation source.

The PCFs preferred for practice of the present invention have a zero-dispersion wavelength (ZDW) only outside the spectral range of a generated continuum. Preferred PCFs may be referred to as dispersion-flattened dispersion decreased all-normal dispersion fibers (DFDD-ANDiF). In a preferred embodiment of the invention, the fiber 11 employed may be a weakly-birefringent ($1.6 \times 10^{-5}$) PCF (NL-1050-NEG-1, supplied by Crystal Fibre A/S, Denmark), having a core diameter of 2.3 μm, and a length of 9.1 cm, although other all-normal dispersion PCFs, differing in cross-sectional geometry and length are within the scope of the present invention, as claimed below. A length exceeding 5 cm is preferred. Typically, an optical isolator 12 is provided to preclude feedback into the laser, and an attenuator 13 is provided to regulate the intensity used to pump the fiber.

From a cross-sectional scanning electron microscope (SEM) image alone, the all-normal dispersion PCF 11 differs little from a typical zero-dispersion PCF. In preferred embodiments of the invention, a PCF with a hexagonally-arranged hole lattice lacking a central hole is employed, in which dispersion is determined by the pitch length and the hole diameter. The combination of the high optical nonlinearity of the small core and the small normal dispersion around the laser wavelength leads to the spectrally broad SPM-dominated supercontinuum. In contrast to the well-known engineered dispersion of PCF intended for generating the broadest supercontinuum, this all-normal dispersion PCF represents another useful engineered dispersion of PCF suitable for generating relatively broad supercontinuum amendable for ultrashort pulse compression. In accordance with embodiments of the present invention, PCF 11 must exhibit a birefringence of at least $1 \times 10^{-5}$.

The supercontinuum emission 15 generated in PCF 11 is collimated by another lens 14 and subsequently sent to a pulse compressor 16. Within the scope of the present invention, pulse compressor 16 may be a passive configuration of optical elements, such as a prism pair, etc., as known in the art. Alternatively, as shown in FIG. 1, an active pulse shaper, denoted generally by numeral 17, such as that based on the multiphoton intrapulse interference phase scan (MIIPS), may be employed. In MIIPS, a spectral phase is measured and a compensating spectral phase actively imposed by means of a spatial light modulator (SLM) (not shown). The MIIPS technique is described, for example, in U.S. Pat. No. 7,609,731, to Dantus et al., which is incorporated herein by reference.

The supercontinuum (SC) beam 18 that exits pulse shaper 17 is focused by a multiphoton microscope objective 19 onto a non-linear element 20 such as a BBO (beta-barium borate) or KDP (potassium dihydrogen phosphate) crystal, and the resulting second-harmonic generation (SHG) signal 21 is collected by a lens 22 and routed into a fiber-coupled spectrometer 23 interfaced with the pulse shaper 17. The SHG signal is scanned over a parameterized phase function of the SLM by the MIIPS procedure to measure the spectral phase of the supercontinuum pulse at the focus of objective 19. In a preferred embodiment of the invention, objective 19 is a 60X/0.9-NA aberration-corrected (600-1200 nm) objective LUMP1anFL/IR supplied by Olympus Inc. Once the spectral phase is retrieved—typically, in less than 5 min—an opposite-signed (or other) spectral phase can be imposed on the SLM to produce a transform-limited (or shaped) pulse. The resultant pulse has a FWHM width of less than 50 fs, and, preferably less than 12 fs. As evident in FIGS. 2(a) to 2(h), spectral tuning may also be achieved. A tunable duration of 10.8-38.9 fs has been achieved with an average power of 18-70 mW. In sharp contrast to other pulse shapers that rely on a collinear two-beam interferometer, as in spectral interferometry for direct E-field reconstruction (SPIDER) or frequency-resolved optical gating (FROG), to measure the spectral phase, the MIIPS-assisted pulse shaper 17 integrates the pulse measurement and the pulse shaping (including pulse compression) into a single-beam interferometer-free setup, resulting in the maximum experimental simplicity and minimum cost. While MIIPS-assisted pulse shaping is preferred for transform-limited pulse compression, any pulse compression scheme is within the scope of the present invention, as claimed in any appended claims.

In accordance with a preferred embodiment of the invention, horizontally polarized output of ytterbium laser 10, while emitting an average power on the order of ~3 W, is attenuated to 100-1300 mW before launching it in PCF 11. Higher incident powers may undesirably produce a self-organized long-period fiber grating inside the fiber, as has been noted in Tu, et al., *Emergence of self-organized long-period fiber gratings in supercontinuum-generating optical fibers,* 34 *Opt. Lett.*, pp. 668-70 (2009), which is incorporated herein by reference.

The spectrum of the supercontinuum output 15 of PCF 11 before collimation depends on the laser power launched into the PCF, which may be referred to, herein, as the fiber transmitting power. Fiber-coupled optical spectrum analyzer 23 was used, in an experiment, to record the spectrum as a function of the fiber transmitting power, as discussed below, with reference to FIGS. 2 which depict comparisons between observed spectra 6 and fiber continuum spectra 8 calculated on the basis of the scalar generalized non-linear Schroedinger equation (GNLSE), $$\frac{\partial U(z,T)}{\partial z} - \sum_{k\geq 2} \frac{i^{k+1}\beta_k}{k!}\frac{\partial^k U(z,T)}{\partial T^k} = \frac{1}{L_{NL}}\left(i - \frac{1}{\omega_0}\frac{\partial}{\partial T}\right)\left(U(z,T)\int_{-\infty}^{\infty} R(T')|U(z,T-T')|^2 dT'\right).$$  (1)

In the foregoing Eq. (1), U (z, 7) is the pulse envelope normalized by the square root of the peak power of the incident pulses (i.e., $\sqrt{P_0}$), which is a function of propagation fiber length z and the retarded time frame T moving with the pulse at the group velocity, $\omega_0$ is the angular frequency of the incident pulse, and $L_{NL}$ is the nonlinear length that can be calculated from $1/(\gamma P_0)$, where y is the nonlinear coefficient. The left hand side of Eq. (1) models the linear propagation effects characterized by a series of dispersion coefficients $\beta_k$. The nonlinear response function R(t) in Eq. (1) can be written as $$R(t) = (1 - f_R)\delta(t) + f_R\frac{\tau_1^2 + \tau_2^2}{\tau_1\tau_2^2}\exp\left(-\frac{t}{\tau_2}\right)\sin\left(\frac{t}{\tau_1}\right),$$  (2)

where the first term and the second term on the right hand side of Eq. (2) represent the contribution of the instantaneous electronic response and delayed Raman response, respectively.

Under a wide range of fiber lengths and the incident powers (0.2-1 W), the spectrum of the continuum generated from the PCF depends sensitively on the polarization of the incident laser beam. Rotating a half wave plate 9 (shown in FIG. 1) before aspheric lens 14 does not typically change the power of the continuum, but noticeably changes the spectrum of the continuum, particularly at high incident powers. The emergent continuum may become rather unpolarized, particularly at long fiber lengths and high incident powers.

Varying the polarization of the incident CW beam by the half wave plate while measuring the polarization extinction ratio (PER) of the fiber output by the polarizer and the power meter allows two orthogonal polarization orientations of the incident CW beam to be identified that maximize the PER of the fiber output at around 20 dB. The two polarization orientations of the highly polarized fiber output corresponding to the two orthogonal polarization orientations of the incident beam are orthogonal to each other, indicating that the PCF has two principal axes along which linearly polarized incident light remains linearly polarized, i.e., a short length PCF can be treated as a linearly birefringent fiber with no detectable elliptical birefringence.

With the two principal axes of the PCF identified, the polarization of an incident CW beam at 45° between the two principle optical axes of the PCF may be used to measure the periodicity of the polarization pattern of the fiber output, i.e., the beat length. The measured beat length in the preferred PCF 11 described above corresponds to a linear birefringence of $1.5\pm0.6\times10^{-5}$ at a wavelength of 1041 -nm. Since the core diameter of the PCF was only 2.3 μm, it is speculated that unintentional structural symmetry breaks during the fiber fabrication leads to such linear birefringence at short fiber lengths. This type of unintentional birefringence could be present in a wide variety of nonlinear PCFs FIGS. 2(a)-2(h) shows the results of fiber continuum generation experiments conducted on PCF 11 having a linear birefringence of $1.9\times10^{-5}$ and a length of 9.1 cm. The polarization of the incident laser pulses was set along the strong polarization-maintaining axis of the fiber, and the spectra of the continuum was recorded at fiber output powers of 0.061 W, 0.130 W, 0.225 W, and 0.361 W [FIG. 2(a)-2(d)]. The highly polarized fiber continua allow direct comparison with the theoretical results from the scalar GNLSE. The spectrum of the incident laser pulse is designated by numeral 5.

The theoretically calculated spectra 8 at the four fiber output powers are compared with corresponding observed spectra 6, showing a high degree of quantitative agreement. The validity of the scalar GNLSE is rigorously confirmed considering that only one adjustable parameter is used to fit all four spectra.

Further discussion of continuum generation and subsequent pulse compression in accordance with embodiments of the present invention is provided in Tu et al., *Scalar generalized nonlinear Schrödinger equation-quantified continuum generation in an all-normal dispersion photonic crystal fiber for broadband coherent optical sources*, 18 *Opt. Exp.* 27872-84 (20 Dec. 2010) and in Tu et al., *Compression of fiber continuum pulses to the Fourier-limit in a high numerical-aperture focus*, 36 *Opt. Lett.* 2315-17 (2011), both of which are incorporated herein by reference.

The embodiments of the invention described above are intended to be merely exemplary; numerous variations and modifications will be apparent to those skilled in the art. For one example, the solid-state Yb laser described herein may also be replaced by a Yb fiber laser having similar pulse properties, within the scope of the present invention. All such variations and modifications are intended to be within the scope of the present invention as defined in any appended claims.

What is claimed is:

1. A method for generating ultrashort optical pulses, the method comprising:
   a. coupling polarized pulses of a near-infrared source, each polarized pulse characterized by a pulsewidth, into a birefringent photonic crystal fiber characterized by normal dispersion at all wavelengths of transmission of the photonic crystal fiber, substantially along a principle axis of the photonic crystal fiber;
   b. generating supercontinuum pulses from the photonic crystal fiber; and
   c. compressing the supercontinuum pulses to form a plurality of compressed pulses, each compressed pulse characterized by a full-width-half-maximum pulsewidth.

2. A method in accordance with claim 1, wherein generating supercontinuum pulses from the photonic crystal fiber includes generating supercontinuum pulses with a high polarization extinction ratio.

3. A method in accordance with claim 1, wherein each polarized pulse is characterized by an energy per pulse exceeding 2 nJ.

4. A method in accordance with claim 1, wherein each polarized pulse is characterized by a pulsewidth shorter than 2 ps (FWHM).

5. A method in accordance with claim 1, further comprising frequency-doubling the plurality of compressed pulses.

6. A method in accordance with claim 1, wherein the full-width-half-maximum pulsewidth of the plurality of compressed pulses is less than 50 femtoseconds.

7. A method in accordance with claim 1, wherein the full-width-half-maximum pulsewidth of the plurality of compressed pulses is less than 12 femtoseconds.

8. A method in accordance with claim 1, wherein the full-width-half-maximum pulsewidth of the plurality of compressed pulses varies as a continuous function of the energy per pulse of the near-infrared source.

9. A method in accordance with claim 1, wherein the compressed pulses are spectrally filtered to generate wavelength-tunable pulses.

10. A method in accordance with claim 1, wherein the near-infrared source is a diode-pumped solid-state yttrium laser.

11. A method in accordance with claim 1, wherein the photonic crystal fiber is characterized by a length longer than 5 cm.

12. A method in accordance with claim 1, wherein the step of frequency doubling is performed in a non-linear crystal.

13. An apparatus for generating ultrashort optical pulses, the apparatus comprising:
   a. a near-infrared source of polarized pulses characterized by a pulsewidth shorter than 2 ps and an energy per pulse exceeding 2 nJ;
   b. a photonic crystal fiber characterized by a birefringence of greater than $1\times10^{-5}$, and by normal dispersion at all wavelengths of transmission of the photonic crystal fiber; and
   c. a pulse compressor for compressing each supercontinuum pulse exiting the photonic crystal fiber.

14. An apparatus in accordance with claim 13, wherein the near-infrared source is an ytterbium laser.

* * * * *